Patented Jan. 20, 1953

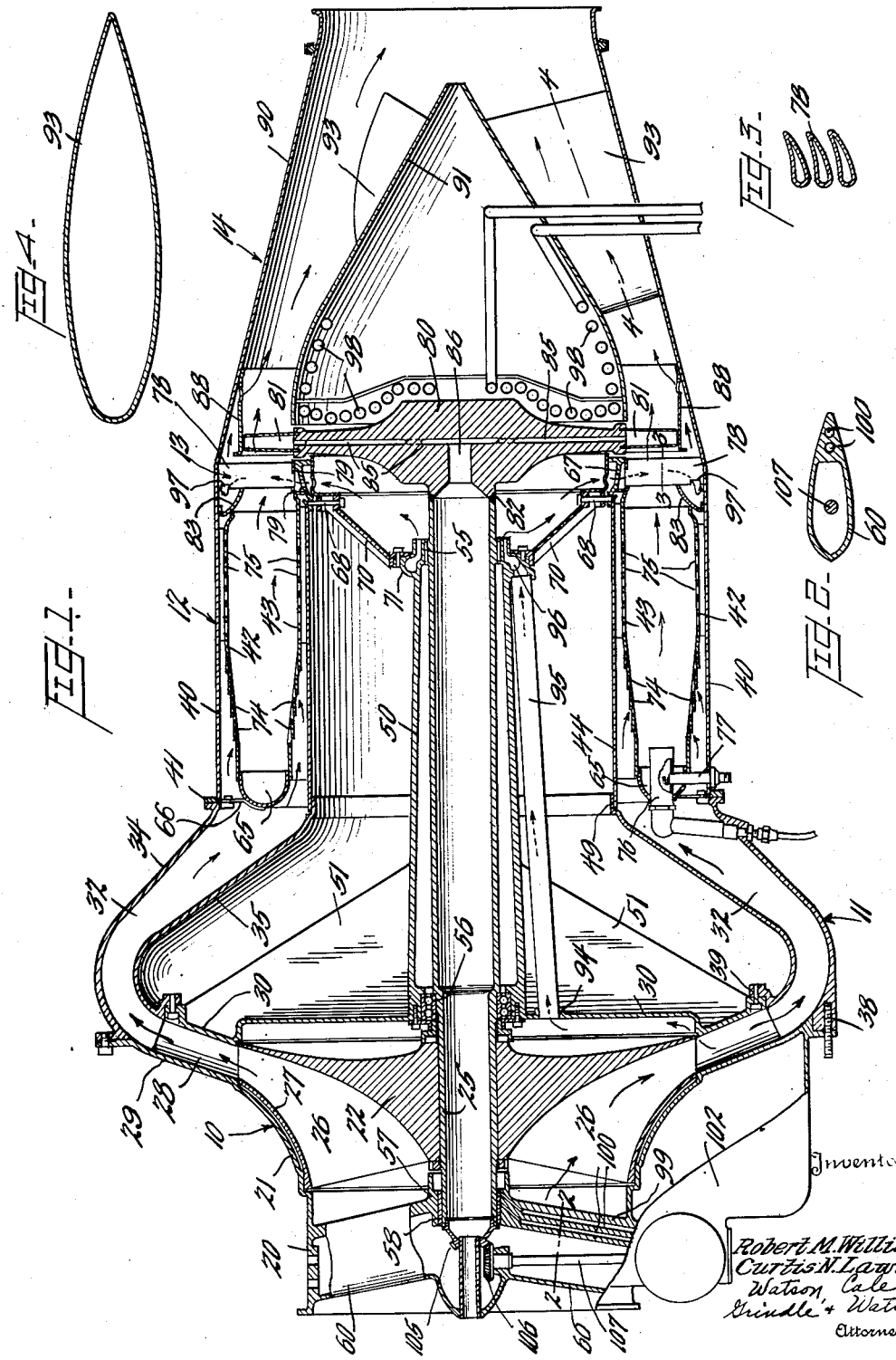

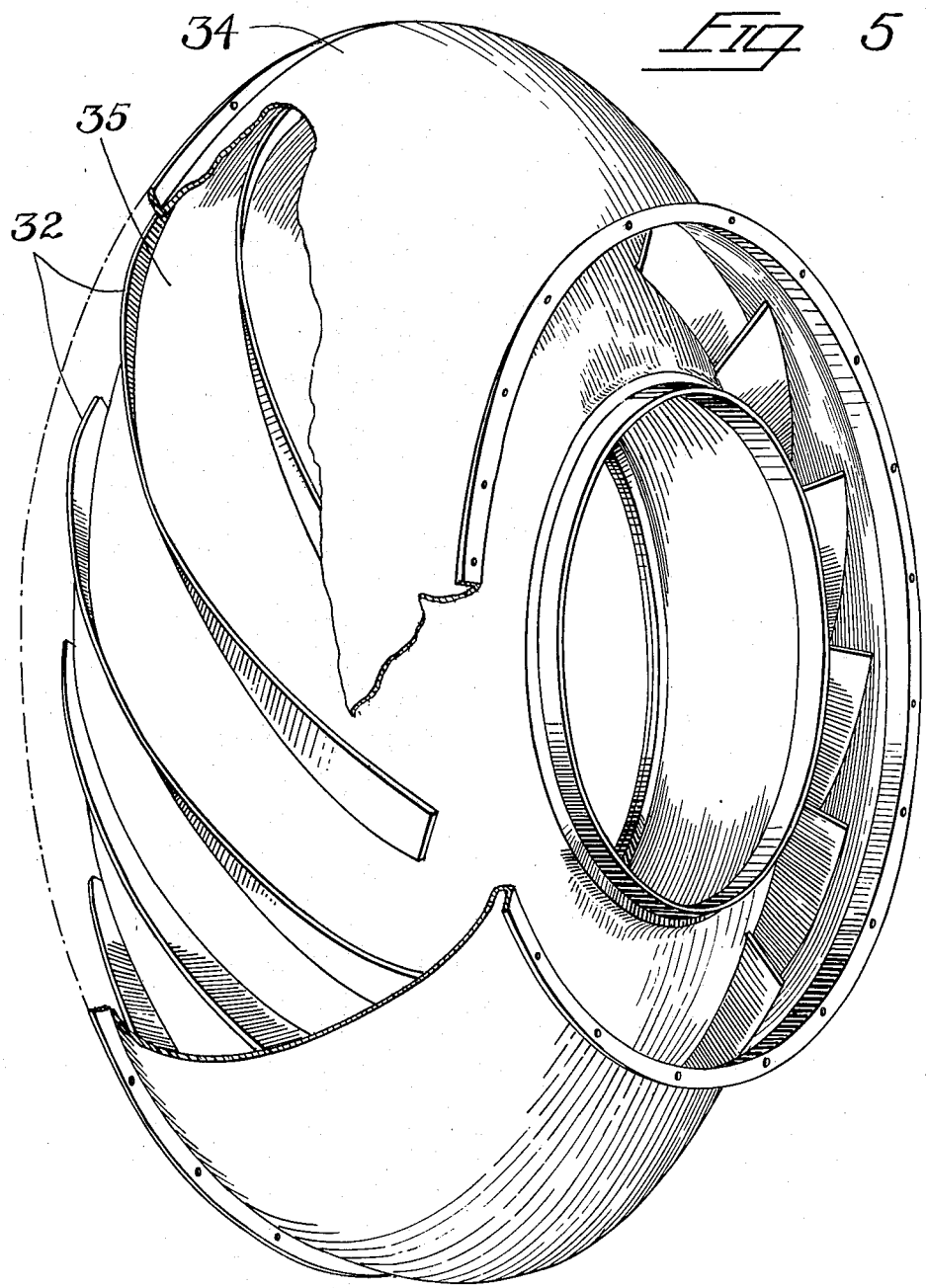

2,625,794

UNITED STATES PATENT OFFICE 2,625,794

GAS TURBINE POWER PLANT WITH DIVERSE COMBUSTION AND DILUENT AIR PATHS

Robert M. Williams and Curtis N. Lawter, Toledo, Ohio, assignors to Packard Motor Car Company, Detroit, Mich., a corporation of Michigan Application February 25, 1946, Serial No. 649,871

2 Claims. (Cl. 60—39.65)

This invention relates to improvements in power plants such as gas turbines and is concerned principally with jet propulsion units suitable for use in aircraft. It is a general object of the invention to provide a unit of this type which may be easily fabricated in large quantities with the use of a minimum of strategic materials. A further general object of the invention is the provision of a jet propulsion unit characterized by low weight and high operating efficiency, and capable of developing high power for prolonged periods without damage from excessive heating.

It is an object of the invention to minimize the end thrust to which the turbine wheel is normally subjected by applying against the forward face of the wheel of air under a selected pressure, preferably taken from the rear of the impeller.

More specifically, it is an object of the invention to provide a jet propulsion unit of which the principal elements are a compressor, a diffuser, a combustion chamber, a turbine, and a discharge nozzle system, in which these several elements are co-axially disposed and in which the compressor and turbine are mounted on a single shaft disposed co-axially of the several elements, the air and gas passages throughout the unit being defined by concentric member of circular transverse section. Thus, in the preferred form of the invention, the air and gas passages of the combustion chamber are constituted by four concentric members, generally cylindrical in contour, having as their common axis the axis of the compressor and turbine. Smooth flow of air and gas through the unit is facilitated by the construction and arrangement of the component parts thereof. The air enters the compressor axially and is directed radially and rearwardly, following in the diffuser a helicoidal annular path to the combustion chamber. The combustion chamber and turbine form a continuation of this annular path, and the gases are discharged through an annular passage, decreasing in radius toward the rear of the unit. Thus the major portion of the air and gas move in a substantially continuous annulus through the unit, the direction of movement at any transverse section having a component toward the rear of the unit. The term "gaseous medium" is employed for convenience herein to include both the air which supports fuel combustion and the resulting combustion gas.

It is a further object of the invention to provide a unit of the type described in which all of the component parts are supported on a main structural assembly to which the stresses are transmitted through the most direct path, this assembly also serving to define a portion of the annular air flow path, including the helicoidal diffusion path.

It is a feature of the invention that the elements constituting the combustion chamber and other parts subjected to high temperatures are so constructed and supported as to allow them to expand freely with temperature increase, and that adequate provision is made to prevent the development of excessive temperatures in critical elements. For instance, it is proposed to cool the elements of the turbine by the use of cooling air and by a special heat exchanger through which part of the heat absorbed by the turbine wheel is utilized to preheat the fuel.

These and other objects and features of the invention will be more apparent from the following specification taken in connection with the accompanying drawings, in which Figure 1 is a longitudinal sectional view through a jet propulsion unit embodying the principles of the invention;

Figures 2, 3, and 4 are fragmentary sectional views taken substantially on the lines 2—2, 3—3, and 4—4 respectively, showing members of air flow contour interposed in the general path of air-gas flow; and Figure 5 is a view in perspective of a preferred form of diffuser.

We have elected to show the invention in its application to a propulsion unit including as its essential elements a compressor, a diffuser, a combustion chamber, and a turbine for driving the compressor, the propulsive force being derived from the reaction of the gases issuing from the unit. It will nevertheless be apparent that certain features of the invention will find useful application in power plants of somewhat different type. It will also be appreciated that the invention is described hereinafter in detail for the purpose of facilitating and understanding the principles of the same, and that such modification of these details is contemplated as may be effected by those skilled in the art to which the invention relates.

Referring specifically to the drawing, and describing first the general arangement of the several essential component parts or sections of the unit, it will be observed that the compressor is indicated at 10, the diffuser at 11, the combustion chamber at 12, the turbine at 13, and the exhaust conduit at 14. Air entering at the forward end of the unit is discharged outwardly and rearwardly by the compressor 10, and permitted to expand with resulting reduction in velocity in the diffuser 11, is admixed with fuel and burned in the combustion chamber 12; the combustion gases and air flow through the turbine 13, which drives the compressor 10 and auxiliary devices as hereinafter described, and are then discharged through the exhaust conduit 14 to provide the reaction for propulsion of the unit. As hereinbefore pointed out, the flow of air and gas at all stages has a component in a rearward direction, and losses due to change in direction of flow are minimized.

At the extreme forward end of the unit, the air flows in through an entrance duct defined by a generally cylindrical impeller inlet cover 20 which is extended rearwardly and flared outwardly as at 21 to form an annular outer casing for the impeller of the compressor. The hub 22 of the impeller is mounted on and secured to a hollow shaft 25, the axis of which is coincident with the axis of the unit as a whole. The blades 26 of the impeller extend between the hub 22, constituting an inner shroud, and an outer annular shroud 27, and are preferably curved throughout their entire length, thus forming a deep inducer and minimizing impeller losses. It will be perceived that the impeller is essentially of the mixed flow type, the air entering the compressor axially and discharging radially with an axial component. The impeller hub, vanes, and outer shroud are preferably formed as an integral unit by casting, and this permits the use of a somewhat larger number of vanes than is practical on a machined impeller, thereby increasing the efficiency and providing additional support for the shroud.

The air is discharged from the impeller outwardly and rearwardly at an angle of approximately 25° into a vaneless diffuser consisting of an annular passage 28, the outer wall 29 of which is formed by a rearward extension of the impeller inlet cover, and the inner wall of which is afforded by a plate or diaphragm 30 which becomes a part of the main structural assembly of the unit. The velocity of the air is reduced in this vaneless diffuser 28 to approximately the speed of sound, principally for the purpose of avoiding difficulties which are inherent in the control of air flow at supersonic velocity.

From the vaneless diffuser 28 the air flows into and through a vaned diffuser, constituted by an annular passage formed by outer and inner nested members indicated at 34 and 35, respectively. Arranged between these nested members 34, 35, are spaced vanes or partitions 32 forming a series of passages from the entrance to the exit end of the diffuser. As shown more particularly in Figure 5, these vanes are substantially radial and extend spirally so that a series of spiral or helicoidal passages are formed extending from one end to the other of the diffuser. At the entrance end of the diffuser the helix angle, or the angle formed by the vanes (and consequently by each of the passages) and an intersecting axial plane, is high, whereas at the exit of each of the passages the corresponding angle is low. Between these two points the angle continuously and progressively changes. Expressing it another way, at the entrance end of the lead of the helix, that is, the amount that the helix advances axially in one revolution, is low, whereas at the exit end the lead of the helix is high. Consequently the spacing between adjacent vanes increases in a rearward direction. Again, the spacing between outer and inner walls 34 and 35 of the diffuser increases in a rearward direction. Thus there is a very substantial increase in cross-sectional area, from the entrance end to the exit end of the vaned diffuser, of each of the passages defined by the annular members 34 and 35 and by the pairs of adjacent vanes, whereby the air velocity is gradually but materially reduced.

It will be noted that the spiral disposition of the vanes also increases the effective length of the diffuser for a given over-all length of unit. The substantial reduction in the air velocity thus afforded reduces the pressure drop in the combustion chamber, promoting complete combustion of the fuel before it reaches the turbine and increasing the efficiency of the machine.

In one unit constructed in accordance with the present invention, twelve vanes 32 are provided, each vane extending through an angle of approximately 90°, the vanes being disposed at equal angles about the axis of the unit. The entrance ends of the passages defined by the vanes and the outer and inner walls 34 and 35 extend substantially in the direction of discharge of air from the impeller so that the air flows smoothly into the spiral or helicoidal passages defined by the vanes. To this end the forward portion of the diffuser increases diametrically in a rearward direction, the air moving outwardly of the unit axis for a short distance; in the rearward and major portion of the diffuser, the diameters of the annular walls 34 and 35 decrease. Thus the air flowing in the diffuser is brought closer to the axis of the unit, and is at the same time adequately expanded.

The vaned diffuser just described is preferably formed as a separate casting of light metal; it is secured at its forward end to the portion 21 of the impeller inlet cover and to the plate or diaphragm 30 of the main structural assembly, as indicated at 38 and 39, respectively, and at its rearward end, as indicated at 41, to the outer cylindrical member 40 of the combustion chamber 12. The inner cylindrical member 44 of the combustion chamber is supported on the inner member 35 of the vaned diffuser with a sliding fit to permit expansion, as indicated at 49. The annular air passage afforded by the diffuser is thus continued through the combination chamber.

Returning to the main structural assembly, it will be observed that this includes the vaned diffuser, the generally radially extending plate or diaphragm 30, the axially disposed tubular member 50 and the radially directed reinforcing webs 51. The diaphragm 30 is bolted directly to the vaned diffuser, and the latter is provided with three or more mounting elements, as indicated at 38, whereby the entire unit can be supported in aircraft or other vehicles.

The hollow shaft 25 is journaled within the tubular member 50, adjacent the rearward end of the latter by means of a plain bearing 55, and adjacent the forward end by means of a radially free ball bearing 56, constructed to resist end thrust of the shaft 25. Radial loads at the forward end of the shaft 25 are carried through a second plain bearing 58 within a boss or hub 57 supported by a plurality of radial struts 60 which extend inwardly from the impeller inlet cover 20. It will be perceived that this structure, while extremely simple and of light weight, is entirely adequate to carry the loads imposed thereon, all stresses being transmitted directly to the frame of the unit.

Actual burning of the fuel takes place in the annular space defined by the generally cylindrical members 42, 43, these members being concentric with the members 40, 44, which define the combustion chamber as a whole, and with the axis of the unit. It will thus be perceived that the combustion chamber consists essentially of four concentrically arranged, generally cylindrical elements, which may be fabricated from sheet metal; the simplicity of this construction and the ease of assembly will be apparent.

The members 42, 43 are secured rigidly at their rearward ends, and at their forward ends are supported with a sliding fit on the outer surface of a semi-toroidal member 65, which is mounted at a plurality of circumferentially spaced points as shown at 66 on the outer wall 34 of the vaned diffuser casting. The innermost member 44 of the combustion chamber is supported at its rearward end with a sliding fit on the annular member 67, which serves also as a support for the turbine nozzle structure. Thus, the members 42, 43, like the member 44, may expand freely in an axial direction at high temperatures. The member 67 is supported by a plurality of pins 68, eight of such pins being employed in the preferred construction. Each of these pins is carried in apertures in the peripheral portion of a supporting diaphragm 70, and is free to move radially, whereby the member 67 may expand and contract in response to temperature change, but is always maintained concentric with the axis of the unit, provided at least three pins are employed. The diaphragm 70 is secured to a boss 71, which is formed at the rear end of the tubular portion 50 of the main structural assembly.

The generally cylindrical elements 42, 43 are provided with louvres 74 and apertures 75, through which air is admitted to the space between these members as it flows through the path defined by the outer and inner walls 40, 44 of the combustion chamber. Fuel-injection nozzles 76 extend into the annular space defined by the semi-torus 65 and the fuel is ignited therein by any suitable means, for instance by one or more spark plugs 77. The flame so produced is confined in the annular space between the elements 42 and 43, the air entering through the louvres and apertures therein being adequate to support combustion. The construction and dimensions are preferably such that combustion does not extend beyond the rearward ends of the elements 42, 43, and the hot gases leaving the burning zone pass through stationary turbine nozzles, which direct the gases at an appropriate angle against the blades of the turbine wheel.

It will be observed that the combustion chamber is so constructed that the zone in which the fuel is consumed is surrounded by air flowing rearwardly in the main combustion chamber passage defined by the inner and outer walls 40, 44. In this manner dissipation of heat is substantially reduced, heat transmitted through the elements 42, 43 being absorbed by the air as it flows through the chamber and within the said passage.

The turbine nozzles are defined by the spaces intermediate a plurality of elements 78 of airfoil shape, as shown more particularly in Figure 3. These elements may be formed by bending sheet stock in suitable dies and are hollow, the hot gases being thus excluded from the interior of the elements. The elements are mounted substantially radially between two concentric rings, the outer ring being constituted by the cylindrical member 40 which defines the combustion chamber, and the inner ring 79 being welded to the member 67, which is mounted as hereinbefore explained.

The inner ring 79 and the member 67 are provided with openings whereby communication is afforded from the interior of the unit to the interior of the elements 78, for a purpose hereinafter set forth. The ring 79 also serves to locate the member 43. The member 42 is located by an annular element 83 contacting with the interior of the outer member 40 of the combustion chamber.

On leaving the turbine nozzles the gases impinge on the blades 81 of a turbine wheel 80, the latter being welded or otherwise secured as at 82 to one end of the hollow shaft 25 on which the compressor-impeller 22 is mounted, as described hereinbefore, so that the compressor is driven directly by the turbine. In the preferred embodiment of the invention the turbine wheel is provided with sixty-eight blades of modified air-foil section, which are retained in position on the main or hub-portion of the wheel, for instance by centrifugal casting of metal around the blade roots. Like the elements 78, which define the turbine nozzles, the turbine blades 81 are hollow, and are placed in communication with the interior of the hollow shaft 25 by radial ducts 85 and an axial passage 86 formed in the hub-portion of the turbine wheel. It will be noted that the shaft 25 extends to the extreme forward end of the unit, so that low-temperature air is admitted to the interior of this shaft and flows rearwardly therein and radially outwardly through the ducts 85 and the interior of the blades 81, flowing out at the blade tips. By means of this arrangement the temperature of the blades is appreciably reduced.

On leaving the turbine, the gases pass within the turbine shroud 88 into a tail-cone 90, which may be formed as a rearwardly directed continuation of the outermost cylindrical member 40 defining the combustion chamber, this cone tapering rearwardly to provide the exhaust jet nozzle. Since the exhaust nozzle is free at its rearward end, it may expand and contract freely with temperature change. Within the exhaust nozzle is a second generally conical member 91, formed of sheet metal or the like, over which the exhaust gases flow through the annular path defined between the members 90 and 91. The member 91 is supported on the member 90 by means of a plurality of hollow struts 93 of airfoil contour, formed in section as shown more particularly in Figure 4.

The generally radial plate or diaphragm 30 of the main structural assembly is apertured as indicated at 94 to receive one end of a pipe 95, which extends axially and communicates with an annular chamber 96 formed in the boss 71 at the rear end of the tubular part 50 of the structural member. Air is bled from the rear end of the compressor into the space at the rear of the impeller, flows through the pipe 95 into the annular chamber 96, and there acts as a cooling medium to reduce the temperature of the bearing 55 disposed adjacent to and supporting the turbine wheel. From the chamber 96 this cooling air flows out rearwardly and through the hollow members 78 which define the turbine nozzles, leaving the latter at 97 and flowing rearwardly through openings in the turbine shroud 88 into the main gas stream. In this manner the members which define the turbine nozzles are maintained within safe temperature limits.

Owing to the rotational effect of the impeller, the pressures at the rear side of the same vary from a minimum near the axis to a maximum at the periphery. It is thus possible to withdraw air from the rear of the impeller at any desired pressure by positioning the forward end of the pipe 95 at the proper radial distance from the axis of the impeller. The pressure acting on the forward face of the turbine wheel 80 may be so selected in this manner as to aid in balancing the thrust on the impeller. There is a forward thrust on the rear face of the impeller due to the pressure of the air discharged by the impeller exerting itself over the area of the impeller rear face. This impeller thrust may be balanced by the rearward thrust of the gases discharged from the nozzles impinging on the turbine blades and by the previously mentioned selected thrust on the forward face of the turbine wheel 80. It will therefore be appreciated that the structure just described for bleeding air from the rear of the impeller performs several important functions.

Disposed adjacent the rear face of the hub-portion 89 of the turbine wheel, and within the conical member 91, is a series of heat-exchange coils 98, through which fuel to be supplied to the injection nozzles 76 is circulated. By means of this arrangement, the radiant heat to, and consequently the temperature of, the turbine wheel is reduced and the fuel is preheated to insure more complete combustion.

Returning to the construction of the forward end of the unit, it will be perceived from Figures 1 and 2 that one of the hollow struts 60 is provided with a web-portion 99, which is apertured as indicated at 100 to permit the pumping of oil to and from the forward bearing 56. Formed integrally with, or secured rigidly to, the impeller inlet cover 20 is a housing 102, on which may be provided certain of the accessory equipment, such as an oil pump, a fuel pump, a governor and regulator combination, a starter, a generator, etc. These various accessories are driven from a bevel gear 105 mounted on the forward end of the drive-shaft 25 and meshing with a cooperating bevel gear 106, which, in turn, is mounted on a shaft 107 extending into the accessory housing 102.

It will be perceived from the foregoing that power units constructed in accordance with the instant invention embody novel features of construction, all contributing to a light, highly efficient and simply fabricated plant which lends itself readily to mass production.

Having thus described the invention, what is claimed as new and desired to be secured by Letters Patent is:

1. In a power plant of the type described having a combustion chamber in which fuel and air are admixed and burned and including air intake and compression devices for delivering air under pressure to said chamber, the combination with a turbine to which combustion gases are delivered from said chamber, said turbine comprising a turbine wheel having blades, and turbine nozzles directing the gases against said wheel blades, the walls defining said nozzles being constituted by hollow members from the interior of which the combustion gases are excluded, of means communicating with said air intake and compression devices for causing a flow of low temperature air through the interior of said members to prevent excessive heating thereof, said blades having generally radial passages extending therethrough, the blades being open at each end thereof, means separate from said first named means for causing a flow of low temperature air through said passages and through the openings at the blade ends to effect reduction of blade temperature, and means returning the air discharged from the interior of said members and from said blade passages to the gases discharging from said turbine blades.

2. In a power plant of the type described having a combustion chamber in which fuel and air are admixed and burned, and a turbine to which exhaust gases are delivered from said chamber, said turbine including a turbine wheel, the combination with a compressor including an impeller delivering air under pressure to said combustion chamber, of means admitting air so delivered to the rear face of the impeller, and means including a plate cooperating with the rear face of the impeller to form a radial chamber, and a pipe disposed at one side of the impeller axis and affording communication between said chamber and the forward face of the turbine wheel, for delivering air under pressure from a point adjacent the rear face of the impeller to the forward face of the turbine wheel, said point being so located radially of said impeller that the pressure of air thus applied to the forward face of the turbine wheel substantially counteracts the end thrust applied to said turbine wheel by gases discharging therefrom.

ROBERT M. WILLIAMS.
CURTIS N. LAWTER.

REFERENCES CITED

The following references are of record in the file of this patent:

UNITED STATES PATENTS

| Number | Name | Date |
|---|---|---|
| 55,082 | Gericke | May 29, 1866 |
| 100,838 | Andrews | Mar. 15, 1870 |
| 112,513 | Thompson | Mar. 7, 1871 |
| 1,648,049 | Howarth | Nov. 8, 1927 |
| 1,777,097 | Lasley | Sept. 30, 1930 |
| 1,819,485 | Sedlmeir | Aug. 18, 1931 |
| 1,960,810 | Gordon | May 29, 1934 |
| 2,149,510 | Darrieus | Mar. 7, 1939 |
| 2,221,816 | Schaper | Nov. 19, 1940 |
| 2,244,467 | Lysholm | June 3, 1941 |
| 2,275,543 | Meyer | Mar. 10, 1942 |
| 2,326,072 | Seippel | Aug. 3, 1943 |
| 2,390,506 | Büchi | Dec. 11, 1945 |
| 2,391,779 | Griffith | Dec. 25, 1945 |
| 2,397,169 | Troller | Mar. 26, 1946 |
| 2,401,826 | Halford | June 11, 1946 |
| 2,404,275 | Clark | July 16, 1946 |
| 2,404,428 | Bradbury | July 23, 1946 |
| 2,405,048 | Nickerson | July 30, 1946 |
| 2,405,723 | Way | Aug. 13, 1946 |
| 2,463,851 | Browne | Mar. 8, 1949 |
| 2,468,461 | Price | Apr. 26, 1949 |

FOREIGN PATENTS

| Number | Country | Date |
|---|---|---|
| 456,980 | Great Britain | Nov. 16, 1936 |
| 346,599 | Germany | Jan. 5, 1922 |
| 696,062 | Germany | Sept. 10, 1940 |